US012669851B2

(12) United States Patent
Kelly et al.

(10) Patent No.: US 12,669,851 B2
(45) Date of Patent: Jun. 30, 2026

(54) CAMERA ASSEMBLY FOR AN ELECTRONIC DEVICE

(71) Applicant: Lenovo (Singapore) Pte. Ltd., Singapore (SG)

(72) Inventors: Sean C. Kelly, Barrington, IL (US); Takashi Kubota, Tokyo (JP); Zhijia Wen, Beijing (CN); Qiang Wang, Beijing (CN); Koji Kawakita, Yokohama (JP)

(73) Assignee: LENOVO (SINGAPORE) PTE. LTD, Singapore (SG)

( * ) Notice: Subject to any disclaimer, the term of this patent is extended or adjusted under 35 U.S.C. 154(b) by 75 days.

(21) Appl. No.: 18/622,145

(22) Filed: Mar. 29, 2024

(65) Prior Publication Data
US 2025/0306648 A1     Oct. 2, 2025

(51) Int. Cl.
| | |
|---|---|
| *H04N 25/443* | (2023.01) |
| *G06F 1/16* | (2006.01) |
| *H04N 23/55* | (2023.01) |
| *H04N 23/63* | (2023.01) |

(52) U.S. Cl.
CPC ........... *G06F 1/1686* (2013.01); *H04N 23/55* (2023.01); *H04N 23/631* (2023.01); *H04N 25/443* (2023.01)

(58) Field of Classification Search
CPC ...... H04N 25/42; H04N 25/44; H04N 25/443; H04N 25/445; H04N 23/631; G06F 1/1686

USPC ........................................................ 348/207.1
See application file for complete search history.

(56) References Cited

U.S. PATENT DOCUMENTS

| | | | | |
|---|---|---|---|---|
| 9,094,540 | B2 * | 7/2015 | Venable | H04N 7/00 |
| 11,490,032 | B2 * | 11/2022 | Mustapha | H04N 5/2628 |
| 11,882,368 | B1 * | 1/2024 | Sheridan | H04N 23/80 |
| 12,148,340 | B1 * | 11/2024 | Kelly | G06F 1/1681 |
| 2007/0188636 | A1 * | 8/2007 | Augusto | H04N 25/00 348/294 |
| 2020/0358963 | A1 * | 11/2020 | Manzari | H04N 23/633 |
| 2025/0240534 | A1 * | 7/2025 | Kitayama | H04N 23/55 |

FOREIGN PATENT DOCUMENTS

DE          102015016167 A1 *  6/2016   ............ H04N 25/42

* cited by examiner

*Primary Examiner* — Anthony J Daniels
(74) *Attorney, Agent, or Firm* — Carroll, Hoette & Butscher, LLC; Josef L. Hoffmann

(57) ABSTRACT

An electronic device is provided that includes a camera assembly. The camera assembly can include a lens that forms an image perimeter that defines an image circle, and a camera sensor aligned with the image circle and configured to obtain image data. The camera sensor may encompass the image circle to cover the image circle entirely with the camera sensor. The electronic device can also include a memory to store executable instructions, and one or more processors, when implementing the executable instructions, configured to generate a captured image from the image data obtained from the camera sensor.

20 Claims, 3 Drawing Sheets

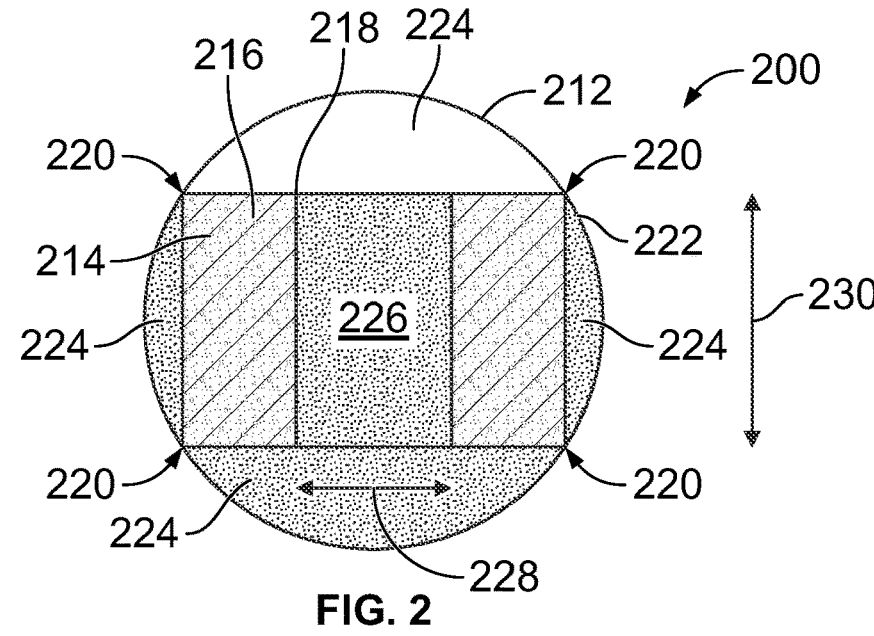
FIG. 2
(Prior Art)
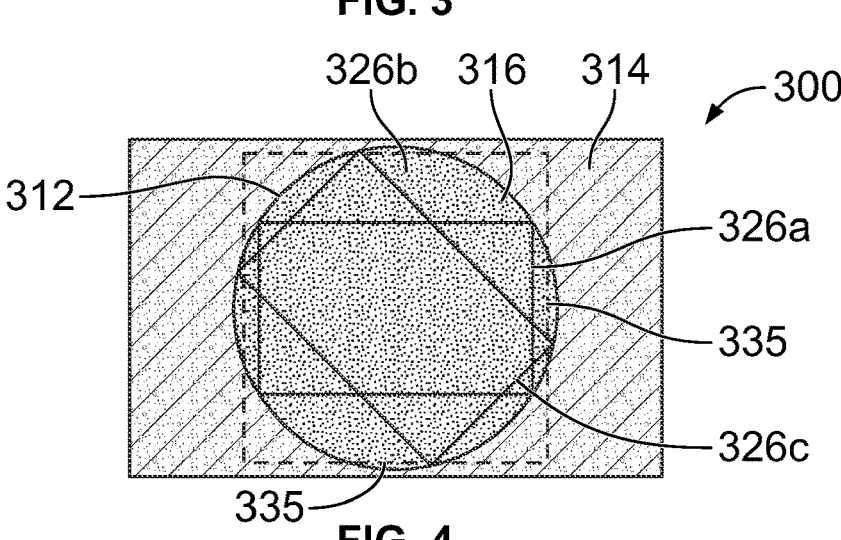
FIG. 3
FIG. 4

CAMERA ASSEMBLY FOR AN ELECTRONIC DEVICE

FIELD

The present disclosure relates generally to a camera assembly of an electronic device.

BACKGROUND OF THE INVENTION

Electronic devices, including smartphones, tablets, laptop computers, etc. typically include a camera assembly for capturing images. The camera assembly includes a camera sensor, a lens, and an image circle, through which the camera assembly captures the image. The camera sensor can include numerous camera pixels that subscribe only a portion of the image circle, thus leaving uncaptured image area outside of the sensor array of sensor pixels. This can limit the aspect ratios that can be imaged at the effective focal length.

In addition, as a result of this configuration, capturing in certain modes (e.g., landscape or portrait, and angled) depending on the shape of the camera sensor generally requires rotating the capture platform to capture at a desired aspect ratio, or cropping out an aspect ratio of interest that results in an attendant focal length magnification/field of view reduction. Consequently, as the electronic device becomes larger, such movement and rotation of the electronic device becomes more and more difficult. As an example, rotating a laptop computer to capture such images is cumbersome and functionality is limited.

SUMMARY

In accordance with embodiments herein, an electronic device is provided that includes a camera assembly. The camera assembly can include a lens that forms an image perimeter that defines an image circle, and a camera sensor aligned with the image circle and configured to obtain image data. The camera sensor may encompass the image circle to cover the image circle entirely with the camera sensor. The electronic device can also include a memory to store executable instructions, and one or more processors, when implementing the executable instructions, configured to generate a captured image from the image data obtained from the camera sensor.

Optionally, the one or more processors can be further configured to crop the captured image in an X-direction and in a Y-direction to form a cropped image. In one aspect, the one or more processors may be further configured to display the cropped image on an output device. In another aspect, the camera sensor can include a plurality of camera sensor pixels that each obtain a portion of the image data. Alternatively, the camera sensor pixels can be complementary metal-oxide semi-conductor (CMOS) camera sensors. In one example, the electronic device may be a laptop computer.

Optionally, the electronic device can additionally include a display screen that includes the image circle and can be configured to display the captured image, and an input rotatably that may be coupled to the display screen. In one aspect, the input can be a keyboard. In another aspect, the input can be configured to receive inputs from a user that include cropping of the captured image.

In accordance with embodiments herein, an electronic device is provided that can include a keyboard with coupled to a display screen wherein the keyboard is configured to provide inputs for the display screen. The display screen can include a bezel that contains a camera assembly. The camera assembly can include a lens forms an image perimeter that defines an image circle, and a camera sensor aligned with the image circle and configured to obtain image data. The camera sensor can encompass the image circle. The electronic device can also include a memory to store executable instructions and one or more processors, when implementing the executable instructions, configured to generate a captured image from the image data obtained from the camera sensor.

Optionally, the image circle can be entirely covered by the camera sensor. In one aspect, the one or more processors can be further configured to crop the captured image in an X-direction and in a Y-direction to form a cropped image. In another aspect, the one or more processors can be further configured to display the cropped image on an output device. In one example, the camera sensor may include a plurality of camera sensor pixels that are complementary metal-oxide semi-conductor (CMOS) camera sensors that each obtain a portion of the image data. In another example, the electronic device can be a laptop computer.

In accordance with embodiments herein, an electronic device is provided that can include a camera assembly. The camera assembly can include a lens forms an image perimeter that defines an image circle, and a camera sensor aligned with the image circle and configured to obtain image data. The image circle can be covered by the camera sensor. The electronic device can also include a memory to store executable instructions and one or more processors, when implementing the executable instructions, configured to generate a captured image from the image data obtained from the camera sensor. The one or more processors can also be configured to crop the captured image to form a cropped image.

Optionally, to crop the captured image can include cropping the captured image in an X-direction or in a Y-direction. In one aspect, the one or more processors can be further configured to display the cropped image on a display screen. In another aspect, the camera sensor may include a plurality of camera sensor pixels that each obtain a portion of the image data. In one example, the electronic device can be a laptop computer.

BRIEF DESCRIPTION OF THE DRAWINGS

FIG. 2 illustrates a schematic diagram of a portion of a prior art camera assembly of an electronic device.

FIG. 3 illustrates a schematic diagram of a portion of a camera assembly of an electronic device in accordance with embodiments herein.

FIG. 4 illustrates a schematic diagram of a portion of a camera assembly of an electronic device in accordance with embodiments herein.

DETAILED DESCRIPTION

Figure 1:
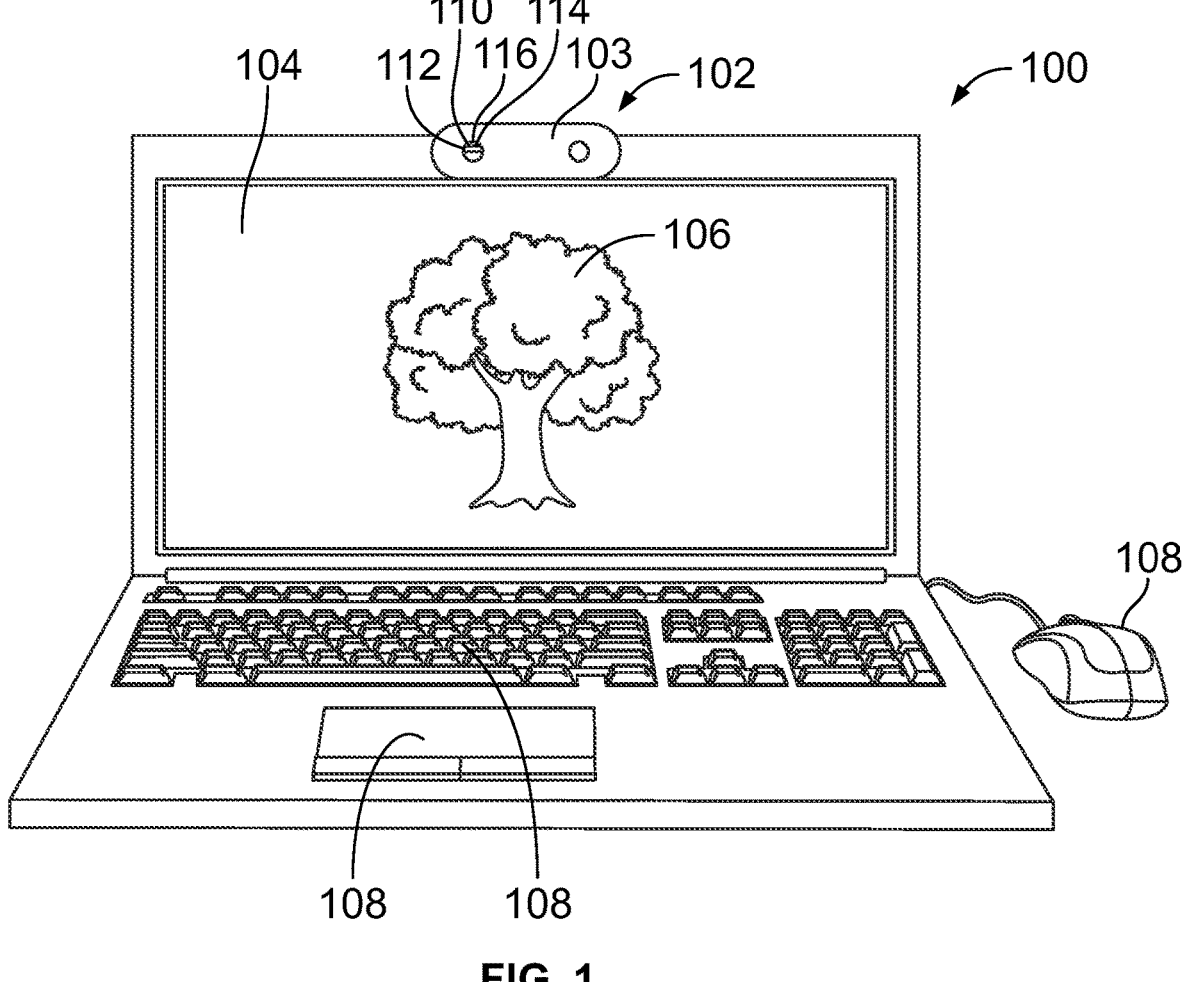
FIG. 1 illustrates a simplified block diagram of an electronic device in accordance with an embodiment.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The term "camera sensor pixels" shall mean an array of camera pixel that collectively form a camera sensor. Each camera sensor pixels captures image data that can be converted into an image.

The term "camera sensor(s)" shall mean an area or element that obtains image data. The camera sensor may be on a substrate and obtain image data by receiving light reflected of the item being imaged. In one example the camera sensor may be a single sensor. Alternatively, the camera sensor can include numerous camera sensor pixels that each capture image data.

The term "image data" shall mean data associated with one or more of two-dimensional (2-D) images, three-dimensional (3-D) images, panoramic images, still images, and/or video images.

The term "captured image" shall mean an image that has been generated from image data. In one example the image data can be received from a camera sensor. In another example the image data can be received from individual camera sensor pixels of the camera sensor. In another example the captured image can be displayed on a display screen and/or stored in a storage device such as a memory.

The term "image circle" shall mean a cross section of a cone of light transmitted one or more lenses onto an image plane. To this end, when the light strikes a digital camera sensor, the light forms a circle of light, and this circle of light is considered the image circle. While the term circle is utilized, any portion of the perimeter of the light that is utilized can be considered a portion of the image circle.

The term "aspect ratio" shall mean a ratio between a width, or X-direction measurement of an image captured compared to a height, or Y-direction measurement of the image captured. In one example, the ratio can be 10 inches in the X-direction by 15 inches in the Y-direction. In another example the ratio can be 15 inches in the X-direction by 10 inches in the Y-direction.

The terms "processor," "a processor", "one or more processors" and "the processor" shall mean one or more processors. The one or more processors may be implemented by one, or by a combination of more than one implantable medical device, a wearable device, a local device, a remote device, a server computing device, a network of server computing devices and the like. The one or more processors may be implemented at a common location or at distributed locations. The one or more processors may implement the various operations described herein in a serial or parallel manner, in a shared-resource configuration and the like.

Provided is a system and method that uses an alternative camera design in which the camera sensors of an electronic device subscribe an entire image circle. All of the image circle is then sampled in the focal plane, as the area of the camera sensor is larger than and encompasses the image circle. With all of the image circle sampled, the camera system can crop a landscape or portrait mode capture with the same number of camera sensor pixels as opposed to a cropping approach. In addition to cropping in landscape or portrait modes (90 deg rotated from each other), the system and method may also crop any angular rotation of a crop window as user desires.

Complementary metal-oxide semi-conductor (CMOS) camera sensors can usually be cropped with onboard windowing functions usually in X or Y directions, for generalized rotation, the camera sensor XY rectangular crop window must superscribe the rotated rectangle image. As a result, when a landscape image is desired, rather than rotating the whole camera and associated platform (PC, Tablet, Phone) the system combines an alternative camera design and sensor readout mode that corresponds to intended aspect ratio. In particular, the camera sensor pixel array is larger than the image circle and superscribes the image circle. Consequently, all regions of the image circle have valid camera sensor pixels as opposed to the typical camera design with a camera sensor pixel array smaller than the image circle. Thus, any rotation of the aspect ratio can be captured without physically moving the camera platform.

FIG. 1 illustrates an electronic device 100 that may be implemented in connection with a camera assembly 102. For example, an electronic device having bezel-less and/or notch-less display surfaces may include front-facing cameras and/or camera sensors placed behind a display stack of an electronic device. The electronic device 100 may be stationary or portable/handheld. Alternatively, the electronic device 100 can be a stationary electronic device such as a laptop computer as illustrated in FIG. 1 that includes a bezel 103 as illustrated. While described as stationary, the electronic device 100 can be moved, picked up, rotated, or the like; however, during typical operation of the electronic device such movements do not occur, whereas for a portable/handheld device, movement is part of the typical operation of the electronic device.

The electronic device 100 includes a display screen 104 that can display an image 106 thereon. The image 106 may include colors, patterns, pictures, letters, numbers, symbols, etc. In one example the display screen 104 can include the bezel 103 where the camera assembly 102 is located. In one example the display screen 104 includes the bezel 103 with components of the camera assembly 102 centrally located along the bezel 103.

The electronic device 100 can also include at least one input 108 that is coupled to the display screen 104. In one example the input 108 is a keyboard that is rotatably coupled to the display screen via a hinge. The input 108 can include a keyboard, mouse, touch screen, microphone, or the like that is configured to provide data, information, or inputs into the electronic device. In one example, an input, or a portion of the input (e.g., a key of a keyboard or a button on a mouse) can be actuated to cause the camera assembly 102 to capture image data. In one example the image to be captured can appear on the display screen 104 as the image 106, and when the input 108 is actuated, the image data of the image is captured to form a captured image.

The camera assembly 102 includes a lens 110 that is surrounded by a lens image perimeter that defines an image circle 112 through which image data can be captured. The camera assembly additionally includes a camera sensor 114 that aligns with the image circle. In one example, the camera sensor 114 can be formed by numerous camera sensor pixels 116 that are configured to capture image data. In an alternative embodiment, the camera sensor 114 is a single element instead of including the numerous pixels. In one example, the camera sensor pixels 116 are CMOS camera sensor pixels. The camera sensor 114 is larger than and encompasses the image circle 112.

Because the camera sensor 114 is larger than the image circle 112, all regions of the image circle have camera sensor pixels 116. Therefore, after an image is generated from the image data obtained from the camera sensor 114 the image can be cropped with windowing functions in X or Y directions (FIG. 4). This allows any rotation of the aspect ratio to be captured without physically moving the camera platform.

FIG. 2 illustrates a portion of a prior art camera assembly 200. In the prior art camera assembly the image circle 212 is larger than the camera sensor 214 that can include an array of camera sensor pixels 216. The field of view 218 of this arrangement is thus represented by the image circle 212 itself. As illustrated, the array of camera sensor pixels 216 is generally rectangular with points 220 at the perimeter 222 of the image circle 212. By being generally rectangular, cropping can be provided in both the X and Y direction for functionality. Still, because the area of the camera sensor 214 is completely within the image circle 212 and rectangular in shape, numerous non-pixel areas 224 are formed within the image circle that surrounds the camera sensor 214.

In addition, the prior art camera assembly 200 includes a capture area 226 that in certain instances, such as illustrated in FIG. 2 when a portrait type image is to be captured, which is less than the area of the camera sensor 214. In particular, the camera sensor 214 has a landscape orientation that does not match the portrait image that is being captured. As used herein, the term "landscape," "landscape image," "landscape picture," etc. each refer to when the object(s) of the image that are desired to be captured have a greater width, or X-direction 228, than height or Y-direction 230. To this end, a landscape capture orientation refers to when the width of the camera sensor 214 is greater than the height of the camera sensor 214 as illustrated in FIG. 2. In examples, a landscape image can be a youth sports team having ten or more members, a mountain range, Mt. Rushmore, the horizon, etc. Similarly, when used herein the term "portrait," "portrait image," "portrait picture," etc. each refer to when the object(s) of the image that are desired to be captured have a greater height, or Y-direction, than width, or X-direction. To this end, a portrait capture orientation refers to when the height of the camera sensor 214 is greater than the width of the camera sensor 214. This can occur when a landscape capture orientation camera sensor 214 such as illustrated in FIG. 2 is rotated ninety degree as a result of rotating the electronic device of the camera assembly 200 ninety degrees. In examples a portrait image can be a single individual, the Statute of Liberty, the Washington Monument, or the like. To this end, the prior art camera assembly 200 illustrated shows a camera sensor 214 that presents a landscape configuration because the X-direction 228 of the camera sensor 214 is greater than the Y-direction 230.

In the prior art camera assembly 200, because the camera sensor 214 is a landscape-oriented rectangle that is fully within the image circle 212, when the capture area 226 is a portrait (or the camera assembly is in a portrait mode) the electronic device and hence camera assembly 200 must be rotated ninety degrees to maximize the capture area 226. Such rotation is simply undesirable when an individual utilizes larger electronic devices such as laptop computers. Alternatively, if the electronic device is not rotated, then when an image within the capture area 226 is captured, either the camera assembly 200, or a user of the camera assembly 200, must crop out a portrait aspect ratio capture from the camera sensor 214 that has the landscape capture orientation camera sensor 214 as is illustrated in FIG. 2. Cropping of the camera sensor capture area 226 reduces both field of view of the camera assembly 200 and resolution while inducing undesirable focal length magnification. In particular, the cropping results in large areas of unused camera sensor pixels 232 on either side of the capture area 226. Thus, a reduced number of pixels are actually utilized during the image capture process, reducing the overall amount of image data captured. As a result, if a user decides to enlarge the image, the quality is greatly reduced.

The example above relates to how rotation of an entire electronic device is needed to improve and increase image data for a landscape-oriented camera sensor 214 when obtaining a portrait-oriented image. In addition, in reality, there are numerous situations in which partial rotation of the camera assembly is required. Hence a user may desire to obtain an image where the best angle of rotation is forty-five degrees instead of ninety, or twenty-five degrees, seventy degrees, etc. For such image captures, again, either the entire electronic device must be rotated to capture the maximum amount of image data, or image data is simply not captured, reducing the quality of the image.

FIGS. 3-4 illustrate the present camera assembly 300. In one example the camera assembly of FIGS. 3-4 is the camera assembly provided in FIG. 1. This camera assembly 300 provides a camera sensor 314 (formed in this embodiment from camera sensor pixels 316) that is larger than the image circle 312. As a result, the design eliminates non-pixel areas from the image circle 312 (compare non-pixel areas 224 of FIG. 2 to FIG. 3). This increases the number of camera sensor pixels 316 that can be utilized to capture image data via the image circle 312 as compared to current camera assemblies such as the one provided in FIG. 2. In this manner, the camera sensor pixels 316 subscribe the entire image circle 312, resulting in the entire image circle 312 to be sampled in the focal plane, regardless of the physical position of the electronic device. In this manner, a user or one or more processors of the camera assembly 300 can crop a landscape capture area 326*a*, a portrait capture area 326*b*, or any other angle capture 326c with the same number of pixels for each mode. In particular, FIG. 4 shows how crop lines 335 can be utilized to crop the capture area 326*a-c*. As illustrated, cropping can occur in both an X-direction and a Y-direction.

Overall, the arrangement of FIGS. 3-4 increases the number of camera sensor pixels 316 that capture image data compared to current camera assemblies while also eliminating focal length magnification as all areas of the image capture areas 326*a-c* are equal in each focal plane. In addition, by increasing the number of camera sensor pixels 316 more image data is obtained, improving image resolution.

Figure 5:
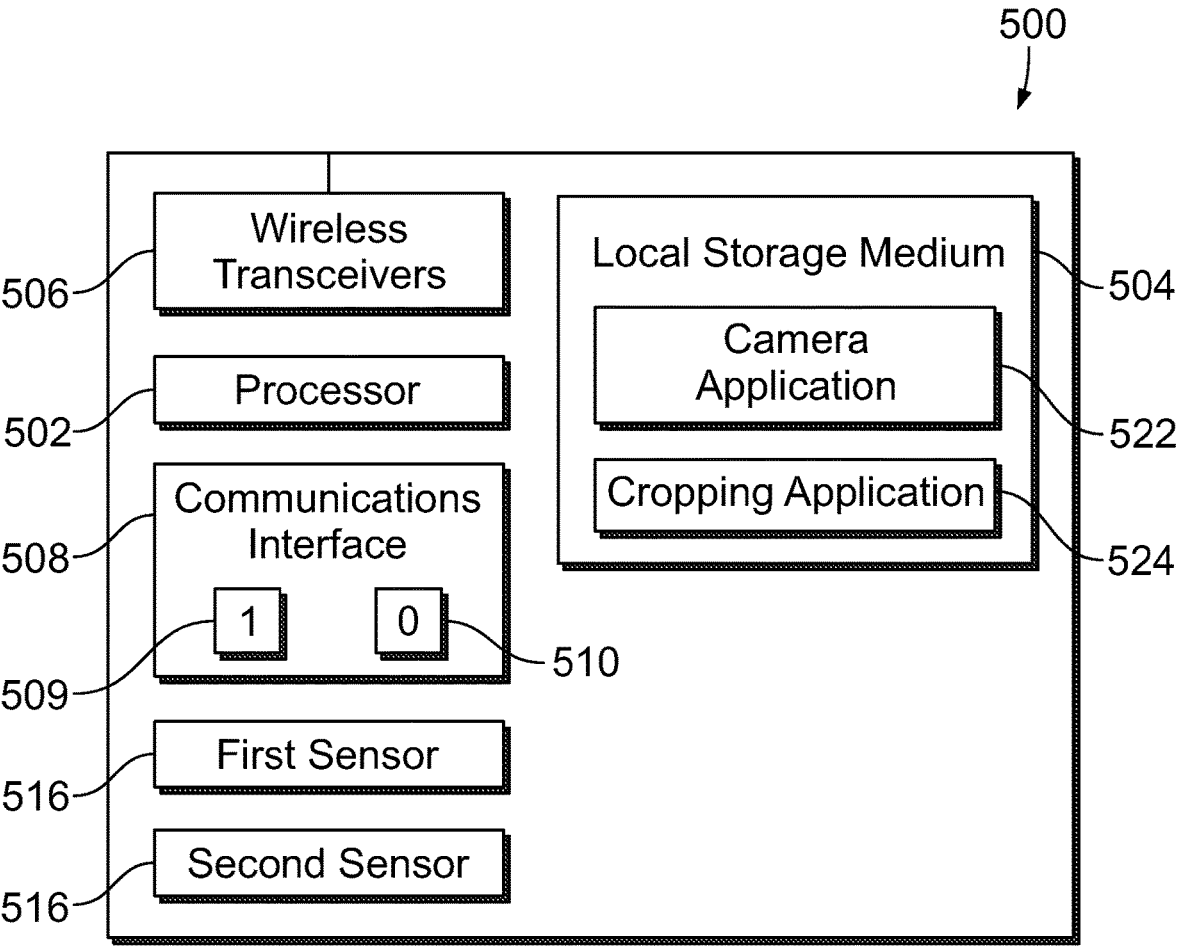
FIG. 5 illustrates schematic block diagram of a control system in accordance with embodiments herein.

FIG. 5 illustrates a control system 500 for a camera assembly. In one example the camera assembly is one of the camera assemblies illustrated in FIGS. 1, and 3-4. The control system 500 in one example can be part of an electronic device and can communicate with the camera assembly to provide functionality of components of the camera assembly. Alternatively, the control system may be part of the camera assembly itself. In yet another example, some components of the control system 500 may be components of the electronic device, or another device, while other components are part of the camera assembly.

The control system 500 includes components such as one or more processors 502 (e.g., a microprocessor, microcomputer, application-specific integrated circuit, etc.), one or more local storage medium (also referred to as a memory portion) 504, one or more wireless transceivers 506, a user interface 508 which includes one or more input devices 509 and one or more output devices 510, and one or more sensors 516, including camera sensors. All of these components can be operatively coupled to one another, and can be in communication with one another, by way of one or more internal communication links, such as an internal bus.

The one or more processors 502 can obtain instructions from the local storage medium to operate the camera assembly. For example, the one or more processors may be configured to obtain image data from a camera sensor of the one or more sensors 516 and generate a captured image from the image data obtained. In another example, the one or more processors 502 can be configured to crop the captured image in the X-direction and/or in the Y-direction to form a cropped image. In another example, the captured image and/or cropped image can be displayed on an output device such as a display screen. To this end, the captured image can be displayed both before and after cropping occurs.

The local storage medium 504 can encompass one or more memory devices of any of a variety of forms (e.g., read only memory, random access memory, static random-access memory, dynamic random-access memory, etc.) and can be used by the processor 502 to store and retrieve data, including image data. The data that is stored by the local storage medium 504 can include, but need not be limited to, operating systems, applications, image data, and informational data. Each operating system includes executable code that controls basic functions of the device, such as interaction among the various components, communication with external devices via the wireless transceivers 506 and/or the component interface 514, and storage and retrieval of applications and context data to and from the local storage medium 506.

The input and output devices 509, 510 may each include a variety of visual, audio, and/or mechanical devices. For example, the input devices 509 can include a visual input device such as an optical sensor or camera sensor, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 510 can include a visual output device such as a liquid crystal display screen, one or more light emitting diode indicators, a mechanical output device such as a vibrating mechanism, etc. The display may be touch sensitive to various types of touch and gestures. As further examples, the output device(s) 510 may include a touch sensitive screen, a non-touch sensitive screen, a text-only display, a smart phone display, and/or any combination thereof.

The local storage medium 506 in one embodiment stores various content including, but not limited to a camera application 522. The camera application 522 includes executable code that utilizes operating systems to perform numerous functions related to obtaining images of objects with a camera assembly. The local storage medium in one example can also include a cropping application 524 for cropping functionality. Cropping functionality allows an image to be captured, or an image that is captured, to have the width and/or the height of the image to be reduced. During the reduction process, the outermost portions of the image are cut, or eliminated. In one example a user may utilize an input such as a touch screen to manually crop the image to be taken, or the image after capture. Alternatively, the camera application 522 and/or cropping application 524 can include instructions to identify an object in an image to be captured and then automatically crop the capture area or crop the captured image.

In all, provided is an improved camera assembly that causes a user of an electronic device to not have to rotate their electronic device to capture images with orientations that differ from the orientation of a camera sensor element. By having the camera sensor encompass the entire image circle, the same number of camera sensor image pixels capture image data for each image, regardless of the positioning of the camera assembly. In addition, the quality of the images captured is increased, while also eliminating focal length magnification. Consequently, the problems of current camera assemblies as described herein have been overcome.

Conclusion

Before concluding, it is to be understood that although e.g. a software application for undertaking embodiments herein may be vended with a device such as the control system, embodiments herein apply in instances where such an application is e.g. downloaded from a server to a device over a network such as the Internet. Furthermore, embodiments herein apply in instances where e.g. such an application is included on a computer readable storage medium that is being vended and/or provided, where the computer readable storage medium is not a carrier wave or a signal per se.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, in the following claims, the phrases "at least A or B", "A and/or B", and "one or more of A and B" (where "A" and "B" represent claim elements), are used to encompass i) A, ii) B and/or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An electronic device comprising:
a camera assembly, comprising:
   a lens that forms an image perimeter that defines an image circle; and
   a camera sensor aligned with the image circle and configured to obtain image data;
   wherein the camera sensor encompasses the image circle to cover the image circle entirely with the camera sensor; and
a memory to store executable instructions; and
one or more processors, when implementing the executable instructions, configured to:
   generate a captured image from the image data within the image circle obtained from the camera sensor; and
   diagonally rotate an aspect ratio of a crop window without physically moving the camera assembly; and
   crop the captured image to form a cropped image;
   wherein the cropped image includes the image data in the crop window and has a diagonal aspect ratio.

2. The electronic device of claim 1, wherein the one or more processors are
further configured to crop the captured image in an X-direction and in a Y-direction to form the cropped image.

3. The electronic device of claim 2, wherein the one or more processors are further configured to display the cropped image on an output device.

4. The electronic device of claim 1, wherein the camera sensor includes a plurality of camera sensor pixels that each obtain a portion of the image data.

5. The electronic device of claim 4, wherein the camera sensor pixels are complementary metal-oxide semi-conductor (CMOS) camera sensors.

6. The electronic device of claim 1, wherein the electronic device is a laptop computer.

7. The electronic device of claim 1, wherein the electronic device further comprises:
a display screen that includes the image circle and is configured to display the captured image; and
an input rotatably coupled to the display screen.

8. The electronic device of claim 7, wherein the input is a keyboard.

9. The electronic device of claim 7, wherein the input is configured to receive inputs from a user that include cropping of the captured image.

10. An electronic device comprising:
a keyboard with coupled to a display screen wherein the keyboard is configured to provide inputs for the display screen;
the display screen including a bezel that contains a camera assembly;
the camera assembly, comprising:
a lens that forms an image perimeter that defines an image circle; and
a camera sensor aligned with the image circle and configured to obtain image data;
wherein the camera sensor encompasses the image circle;
a memory to store executable instructions; and
one or more processors, when implementing the executable instructions, configured to:
generate a captured image from the image data within the image circle obtained from the camera sensor; and
diagonally rotate an aspect ratio of a crop window without physically moving the camera assembly; and
crop the captured image to form a cropped image;
wherein the cropped image includes the image data in the crop window and has a diagonal aspect ratio.

11. The electronic device of claim 10, wherein the image circle is entirely covered by the camera sensor.

12. The electronic device of claim 10, wherein the one or more processors are further configured to crop the captured image in an X-direction and in a Y-direction to form the cropped image.

13. The electronic device of claim 12, wherein the one or more processors are further configured to display the cropped image on an output device.

14. The electronic device of claim 10, wherein the camera sensor includes a plurality of camera sensor pixels that are complementary metal-oxide semi-conductor (CMOS) camera sensors that each obtain a portion of the image data.

15. The electronic device of claim 10, wherein the electronic device is a laptop computer.

16. An electronic device comprising:
a camera assembly, comprising:
a lens that forms an image perimeter that defines an image circle; and
a camera sensor aligned with the image circle and configured to obtain image data;
wherein the image circle is covered by the camera sensor;
a memory to store executable instructions; and
one or more processors, when implementing the executable instructions, configured to:
generate a captured image from the image data within the image circle obtained from the camera sensor;
diagonally rotate an aspect ratio of a crop window without physically moving the camera assembly; and
crop the captured image to form a cropped image;
wherein the cropped image includes the image data in the crop window and has a diagonal aspect ratio.

17. The electronic device of claim 16, wherein to crop the captured image includes cropping the captured image in an X-direction or in a Y-direction.

18. The electronic device of claim 16, wherein the one or more processors are further configured to display the cropped image on a display screen.

19. The electronic device of claim 16, wherein the camera sensor includes a plurality of camera sensor pixels that each obtain a portion of the image data.

20. The electronic device of claim 16, wherein the electronic device is a laptop computer.

* * * * *